UNITED STATES PATENT OFFICE.

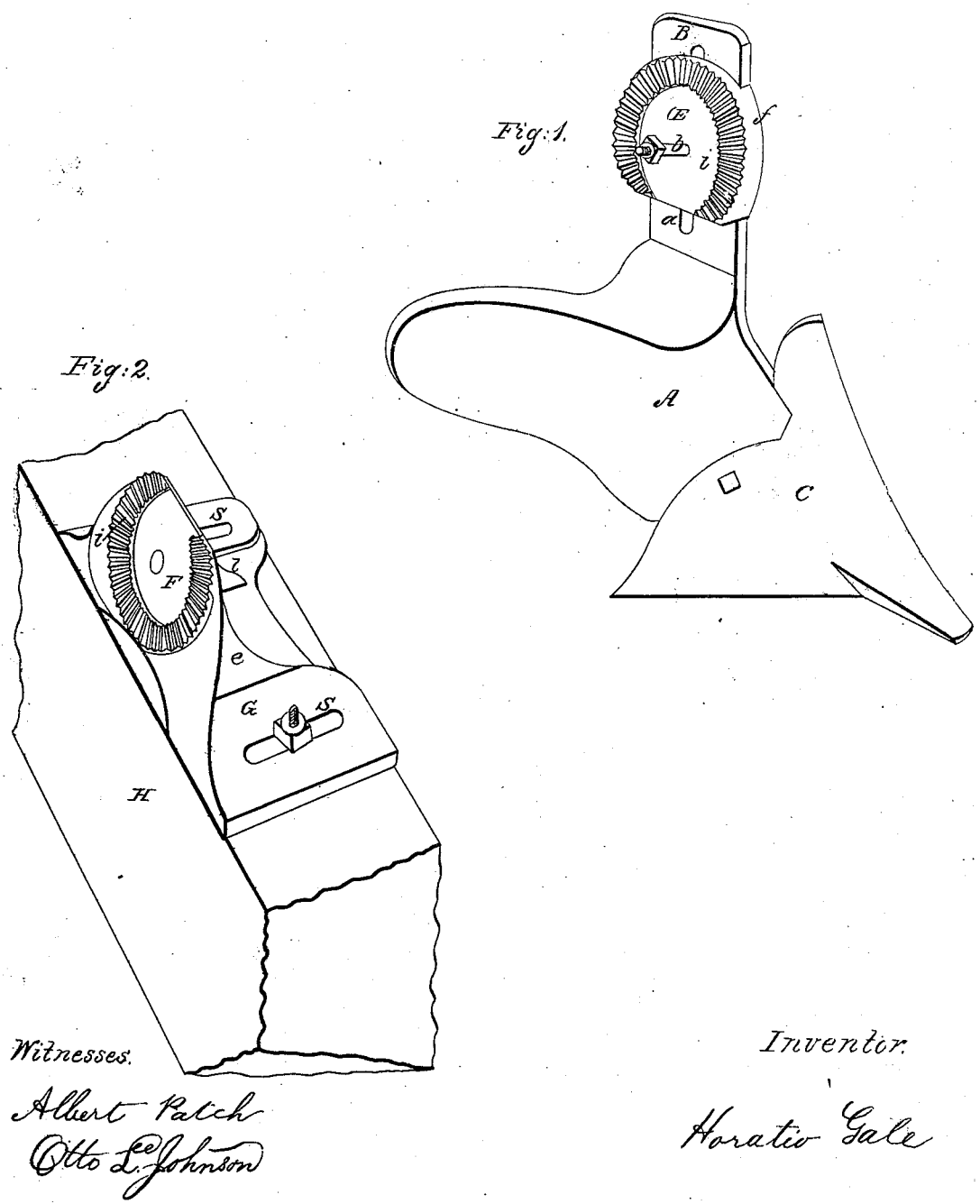

HORATIO GALE, OF ALBION, MICHIGAN.

IMPROVEMENT IN PLOWS.

Specification forming part of Letters Patent No. 107,033, dated September 6, 1870.

*To all whom it may concern:*

Be it known that I, HORATIO GALE, of the village of Albion, in the county of Calhoun and State of Michigan, have invented certain Improvements in Plows, of which the following is a specification.

My invention applies to double plows, of the subsoil type, in which a small plow for turning a surface-furrow is ranged on the same beam in advance of the larger main plow; and it relates to combining with the plow-beam and small plow-standard a laterally-slotted hanger-plate, and a fast and a loose pendent serrated disk, which disks form the point of adjustable attachment for said plow, the object being to combine with all the ordinary means of adjustment a mode of placing the small plow in exact alignment and parallelism with the larger plow, so that their mold-board lines and land-side-faces may be more readily adjusted to a true, equal, and parallel correspondence with each other.

My invention is embodied in the accompanying perspective drawings, in which—

Figure 1 represents the small surface or jointer plow detached, with the adjusted serrated disk in place against the standard. Fig. 2 exhibits the hanger-plate carrying the fast disk, bolted to a broken section of the beam, placed in an inverted position to show the adjusting-slots in the plate.

A represents the mold-board, to which is cast the short standard B, and also the landside, (not shown,) and C exhibits the share, bolted on in the usual way, all constituting the small leading or jointer plow. Inasmuch as the slotted standard is adjustably secured in my arrangement to pendent disks below the under level of the beam, such standard may be much shorter than when fastened to the side of the beam in the common way.

E is the loose adjusting-disk, which lies against the slotted plow-standard B, and is furnished with two side flanges, (one of which is seen at *f*,) which overlap the edges of the standard and serve as guides.

F is the fast disk, cast onto and at a right angle with the hanger-plate G, said disk being usually strengthened by angle-ribs *e e*, and the plate is provided with two lateral slots, *s s*, through which the bolts pass that bolt it adjustably to the under side of the beam H.

Each disk is provided with matched serrations *i* on its face next the periphery, so that the two may interlock firmly together, and with a central bolt-hole to admit the bolt *b*, which passes through the slot *a* in the plow-standard and bolts the whole firmly together.

To adjust the plow for any required depth of furrow its standard is raised or lowered within the space between the guides of the adjusting-disk E. To change the longitudinal pitch or angle, the plow and disk E are drawn back to disengage the serrations, and the plow rocked or rotated in either direction, when the teeth will engage in new places; and to adjust the draft-lines of the small plow to a proper correspondence with the large one, the hanger-plate G and connected plow are moved laterally or twisted around on the beam, for which important adjustment the bolt-slots *s* are specially provided.

The common mode of fastening the standards of these plows to the side of the beam by a gripe permits a somewhat insecure adjustment as to height and pitch; but a lateral adjustment can only be made by cutting away the beam, or by interposed packing, frequently wedge-shaped, all to be done in the field where the plowing is going on, and such mode of adjustment must necessarily be very annoying in practice and very uncertain in result, and there is no known mode of determining the relations which two plows working in one furrow should bear to each other under every varying conditions except by actual experimental use.

My improvement not only enables the last-named important adjustment to be made in a very ready and exact manner, but facilitates and makes secure all the rest, shortens the plow-standard, and forms a compact, complete, and reliable means of adjustable attachment.

I claim as my invention and desire to secure by Letters Patent—

The laterally-adjustable plate G, serrated disks E F, and slotted standard B, all constructed and arranged to operate substantially as described.

HORATIO GALE.

Witnesses:
ALBERT PATCH,
OTTO L. JOHNSON.